United States Patent
Ding et al.

(10) Patent No.: US 12,049,935 B2
(45) Date of Patent: Jul. 30, 2024

(54) LIQUID COMPOSITE SPRING AND METHOD FOR ADJUSTING STIFFNESS AND DAMPING PROPERTY THEREOF

(71) Applicant: ZHUZHOU TIMES NEW MATERIAL TECHNOLOGY CO., LTD, Hunan (CN)

(72) Inventors: Xingwu Ding, Hunan (CN); Jiling Bu, Hunan (CN); Yimeng Li, Hunan (CN); Guijie Liu, Hunan (CN); Feng Wang, Hunan (CN); Zhangyang Xia, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 62 days.

(21) Appl. No.: 17/423,434

(22) PCT Filed: Sep. 4, 2020

(86) PCT No.: PCT/CN2020/113579
§ 371 (c)(1),
(2) Date: Jul. 15, 2021

(87) PCT Pub. No.: WO2021/043281
PCT Pub. Date: Mar. 11, 2021

(65) Prior Publication Data
US 2022/0065326 A1    Mar. 3, 2022

(30) Foreign Application Priority Data

Sep. 6, 2019  (CN) .......................... 201910840156.3
Sep. 6, 2019  (CN) .......................... 201910840263.6

(51) Int. Cl.
*F16F 13/16*   (2006.01)
*F16F 13/08*   (2006.01)
*F16F 13/10*   (2006.01)

(52) U.S. Cl.
CPC ............ *F16F 13/16* (2013.01); *F16F 13/085* (2013.01); *F16F 13/10* (2013.01); *F16F 2226/04* (2013.01)

(58) Field of Classification Search
CPC ........... F16F 13/085; F16F 13/10; F16F 13/16
See application file for complete search history.

(56) References Cited

U.S. PATENT DOCUMENTS

| | | |
|---|---|---|
| 2,417,096 A | 3/1947 | Thiry |
| 6,386,529 B2 | 5/2002 | Bik et al. |
| (Continued) | | |

FOREIGN PATENT DOCUMENTS

| | | |
|---|---|---|
| CN | 2547546 Y | 4/2003 |
| CN | 103104644 A | 5/2013 |
| (Continued) | | |

OTHER PUBLICATIONS

International Search Report and Written Opinion from PCT Application No. PCT/CN2020/113579, Nov. 30, 2020.
(Continued)

*Primary Examiner* — Melody M Burch
(74) *Attorney, Agent, or Firm* — Workman Nydegger

(57) ABSTRACT

A liquid composite spring and a method for adjusting stiffness and damping property of the liquid composite spring such that the liquid composite spring includes an outer sleeve; a core shaft arranged around an upper portion of the outer sleeve. An upper portion of the core shaft is located inside the outer sleeve, while a lower portion extends out of the outer sleeve; an upper liquid chamber formed in an upper space inside the outer sleeve and having a lower (Continued)

portion connected to a top end of the core shaft; and a lower liquid chamber formed in a lower space inside the outer sleeve and connected with the core shaft. The core shaft has a damping flow channel arranged therein, for communicating liquid in the upper liquid chamber with liquid in the lower liquid chamber. The liquid composite spring can provide vibration-reducing effect and change stiffness and damping effect.

16 Claims, 2 Drawing Sheets

(56) References Cited

U.S. PATENT DOCUMENTS

| | | | |
|---|---|---|---|
| 2012/0126090 A1 | 5/2012 | Kojima et al. | |
| 2012/0205845 A1* | 8/2012 | Gedenk | F16F 13/10 267/140.13 |
| 2013/0175745 A1 | 7/2013 | Kojima et al. | |
| 2019/0389296 A1 | 12/2019 | Kojima | |

FOREIGN PATENT DOCUMENTS

| | | | | |
|---|---|---|---|---|
| CN | 103671685 A | | 3/2014 | |
| CN | 104141732 A | * | 11/2014 | |
| CN | 102644692 B | * | 5/2015 | |
| CN | 105526291 A | | 4/2016 | |
| CN | 106704460 A | * | 5/2017 | F16F 13/007 |
| CN | 206347059 U | | 7/2017 | |
| CN | 107023600 A | | 8/2017 | |
| CN | 107489727 A | | 12/2017 | |
| CN | 109236916 A | | 1/2019 | |
| CN | 109236928 A | * | 1/2019 | B61F 5/307 |
| CN | 106574877 B | * | 8/2019 | |
| CN | 110594342 A | | 12/2019 | |
| CN | 110735881 A | | 1/2020 | |
| CN | 211009694 U | | 7/2020 | |
| DE | 10121399 B4 | | 7/2014 | |
| EP | 0014742 B1 | | 9/1982 | |
| EP | 3343064 A1 | | 7/2018 | |
| GB | 2310025 A | * | 8/1997 | F16F 1/38 |
| JP | 2009068605 A | | 4/2009 | |
| RU | 2458273 C2 | * | 8/2012 | F16K 1/52 |
| WO | WO-2008147989 A2 | * | 12/2008 | A63H 18/00 |
| WO | 2011013665 A1 | | 2/2011 | |
| WO | 2011032820 A1 | | 3/2011 | |
| WO | 2012043483 A1 | | 4/2012 | |
| WO | 2018193670 A1 | | 10/2018 | |

OTHER PUBLICATIONS

Chinese Office Action from Corresponding Chinese Patent Application No. CN2019108402636, Sep. 24, 2020.
Extended European Search Report from Corresponding European Patent Application No. EP20860133.6, Sep. 12, 2023.
Chinese Office Action from Corresponding Chinese Patent Application No. CN2019108401563, Jan. 5, 2024.

* cited by examiner

LIQUID COMPOSITE SPRING AND METHOD FOR ADJUSTING STIFFNESS AND DAMPING PROPERTY THEREOF

TECHNICAL FIELD

The present invention relates to a liquid composite spring, in particular for rail vehicles. The present invention further relates to a method for adjusting stiffness and damping property of the liquid composite spring.

TECHNICAL BACKGROUND

Complicated vibration will be generated when a rail vehicle is running on a rail, so that it is necessary to install a spring device on the rail vehicle for reducing mechanical vibrations. Use of traditional rubber cone springs can readily achieve different values of static stiffness in vertical, horizontal and longitudinal directions, thus having remarkable elastic deformation characteristics. Therefore, such rubber cone springs can normally meet the requirements of general axle box suspension. However, due to the limitations of rubber material, the dynamic stiffness of the rubber cone spring will increase slowly and then become stable as the frequency of the vibration increases, so that the nonlinear frequency variation thereof is not striking. At the same time, since the damping property of the rubber material is relatively small, the capability thereof for dissipating vibration energy is limited.

SUMMARY OF THE INVENTION

In view of the above problems, the present invention proposes a liquid composite spring, which can reduce vibration and at the same time provide variable stiffness and high damping property. Moreover, the present invention further proposes a method for adjusting stiffness and damping property of the liquid composite spring, whereby the stiffness of the liquid composite spring can be adjusted based on different frequencies.

The present invention proposes a liquid composite spring, including: an outer sleeve; a core shaft connected to the outer sleeve and having a damping flow channel arranged therein, wherein an upper portion of the core shaft is located inside the outer sleeve, while a lower portion thereof extends out of the outer sleeve; an upper liquid chamber formed in an upper space inside the outer sleeve, wherein a lower portion of the upper liquid chamber is connected to a top end of the core shaft; and a lower liquid chamber formed in a lower space inside the outer sleeve, the lower liquid chamber being connected with the core shaft. The damping flow channel communicates liquid in the upper liquid chamber with liquid in the lower liquid chamber.

In a preferred embodiment, the core shaft is provided with multiple models, and a core shaft of a suitable model is selected according to actual needs when the core shaft is to be mounted. The damping flow channels of the core shafts of different models have different lengths, cross-sectional areas, and length-diameter ratios.

In a preferred embodiment, the damping flow channel is arranged in the core shaft in a spiral manner, wherein an upper end opening of the damping flow channel is axially arranged at the top end of the core shaft, and in communication with the upper liquid chamber and a lower end opening of the damping flow channel is radially arranged in the lower portion of the core shaft, and in communication with the lower liquid chamber.

In a preferred embodiment, the core shaft comprises an inner core of the core shaft, and an outer housing of the core shaft arranged around the inner core. A spiral channel is provided on an outer surface of the inner core to form a main body of the damping flow channel, and the outer housing is provided with a through hole extending along a radial direction, wherein the through hole communicates the spiral channel with the lower liquid chamber to form the lower end opening of the damping flow channel.

In a preferred embodiment, a certain space is formed between the upper liquid chamber and the lower liquid chamber, and a metal-rubber main spring connecting the upper liquid chamber with the lower liquid chamber is arranged in said space.

In a preferred embodiment, the metal-rubber main spring includes rubber bodies connected between the core shaft and the outer sleeve, and a plurality of annular partitioning plates, one partitioning plate being nested in another, wherein a rubber body is arranged between two adjacent partitioning plates.

In a preferred embodiment, the outer sleeve includes a rigid outer sleeve body having a cylindrical shape, and a flexible sealing member for sealing a lower end of the lower liquid chamber, wherein an outer edge of the sealing member is connected to a bottom of the outer sleeve body, and a middle portion thereof is connected to the core shaft.

In a preferred embodiment, a metal ring is provided on the outer edge of the sealing member, and a protrusion clamped into the core shaft is provided on an inner end of the sealing member, wherein a groove in cooperation with the metal ring is provided on an inner side of the bottom of the outer sleeve body, the metal ring being located in the groove and connected to the outer sleeve body by a bolt.

According to another aspect of the present invention, a method for adjusting stiffness and damping property of the above liquid composite spring is proposed, comprising: step 1, preparing an outer sleeve of a universal type and a plurality of core shafts of different models for the liquid composite spring, wherein said core shafts of different models have different damping flow channels; step 2, selecting, for corresponding stiffness and damping property, one core shaft of a suitable model from said core shafts according to requirements on actual frequency operation condition, placing said core shaft selected in the outer sleeve, and mounting a metal-rubber main spring in the outer sleeve so that the upper liquid chamber is formed above the metal-rubber main spring while the lower liquid chamber is formed below the metal-rubber main spring, the damping flow channel of the core shaft communicating the upper liquid chamber with the lower liquid chamber; and step 3, filling the upper liquid chamber and the lower liquid chamber with liquid, respectively, and sealing a lower end of the outer sleeve by a sealing member.

In a preferred embodiment, the method further comprises vulcanizing multiple layers of rubber bodies along a direction from inside to outside, staring from the core shaft, when the metal-rubber main spring is mounted, and arranging an annular partitioning plate between every two adjacent layers of the rubber bodies, wherein an outermost layer of the rubber body is connected to an inner wall of the outer sleeve.

In a preferred embodiment, the damping flow channels of all core shafts prepared have a length-diameter ratio ranged from 12 to 110, with a step value of 5.

In a preferred embodiment, a core shaft of a suitable model is selected according to the requirements on the actual frequency operation condition, wherein under a low frequency operation condition a core shaft provided with a damping flow channel having a length-diameter ratio greater than 26 is selected, while under a high frequency operation condition a core shaft provided with a damping flow channel having a length-diameter ratio less than 26 is selected.

Compared with the prior arts, the present invention has the following advantages.

The liquid composite spring according to the present invention has the upper liquid chamber and the lower liquid chamber that are in communication with each other through the damping flow channel, so that liquid can reciprocally flow between the upper and lower liquid chambers through the inner core of the core shaft. In this manner, vibration reduction can be enhanced, and variable stiffness and improved damping effect can be also achieved.

According to the method for adjusting stiffness and damping property of the liquid composite spring of the present invention, the stiffness and the damping coefficient of the liquid composite spring can be adjusted according to actual requirement on frequency, so that the liquid composite spring can overcome vibrations of various frequencies generated when the vehicle is running. In the method of the present invention, different requirements on the stiffness and the damping coefficient can be met through preparing core shafts of different types. When the rigidity and the damping property are intended to be adjusted, it requires change of the core shaft only, thereby realizing rapid replacement of the core shaft and adjustment of the stiffness of the liquid composite spring.

DETAILED DESCRIPTION OF THE EMBODIMENTS

The present invention will be further described below in conjunction with the accompanying drawings.

Figure 1:
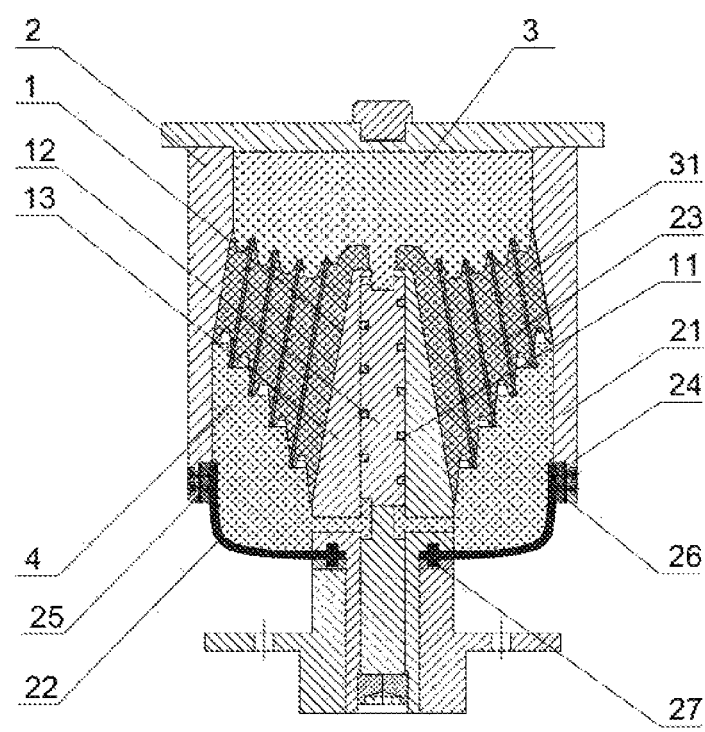
FIG. 1 schematically shows the structure of a liquid composite spring according to an embodiment of the present invention.

FIG. 1 schematically shows a liquid composite spring according to an embodiment of the present invention. In the liquid composite spring according to the present invention, liquid can reciprocally flow in upper and lower liquid chambers through a damping flow channel, especially under vibrations, thereby providing variable stiffness and improved damping effect.

The liquid composite spring according to an embodiment of the present invention as schematically shown in FIG. 1 includes a core shaft 1. An outer sleeve 2 is connected to an upper portion of the core shaft 1, wherein a lower portion of the outer sleeve 2 is arranged around the upper portion of the core shaft 1. The upper portion of the core shaft 1 is located inside the outer sleeve 2, while a lower portion thereof extends out of the outer sleeve 2. An upper liquid chamber 3 is formed in an upper space inside the outer sleeve 2, and a middle area of a lower portion of the upper liquid chamber 3 is connected to a top end of the core shaft 1. In addition, a lower liquid chamber 4 is formed in a lower space inside the outer sleeve 2. The lower liquid chamber 4 is spaced from the upper liquid chamber 3 with a certain space. In this embodiment, a damping flow channel 11 is provided in the core shaft 1, so that liquid in the upper liquid chamber 3 is in communication with that in the lower liquid chamber 4 through the damping flow channel 11.

In use, the liquid composite spring according to the present embodiment is arranged on a bogie of a rail vehicle. Under the vibrations generated when the vehicle is running on a rail, the core shaft 1 will move in the outer sleeve 2. With the upper liquid chamber 3 and the lower liquid chamber 4 in the liquid composite spring according to the present embodiment, liquid can be circulated therebetween, thus changing the volume of the upper liquid chamber 3 and that of the lower liquid chamber 4 when the core shaft 1 moves. Therefore, during circulation of fluid, the damping effect and stiffness of the liquid composite spring are both changed.

In one embodiment, the core shaft 1 is supplied with multiple predetermined models. When a core shaft is intended to be used, one of a suitable model should be selected according to actual needs. In addition, a core shaft of a model could be replaced with one of another model according to actual needs. Core shafts of different models have different damping flow channels 11 of different lengths and widths. If the damping flow channel 11 has a cross section of a circle, the width of the damping flow channel 11 is the inner diameter of the circle. And if the damping flow channel 11 has a cross section of a rectangle, the width of the damping flow channel 11 is the side length of the rectangle. In the present embodiment, the model of the core shaft 1 is defined based on a ratio of the length to the width (i.e., the length-diameter ratio) of the damping flow channel 11.

When the liquid composite spring of the present embodiment is used, the model of the core shaft 1 is selected according to the requirements on the actual frequency operation condition. For example, under a low frequency operation condition, such as a vibration frequency less than 15 Hz, a core shaft provided with a damping flow channel having a length-diameter ratio greater than 26 can be selected, while under a high frequency operation condition, such as a vibration frequency greater than 15 Hz, a core shaft provided with a damping flow channel having a length-diameter ratio less than 26 can be selected.

In one embodiment, an upper end opening of the damping flow channel 11 is axially arranged at the top end of the core shaft 1, and in communication with the upper liquid chamber 3. The upper portion of the core shaft 1 extends into the upper liquid chamber 3, and the lower portion of the upper liquid chamber 3 is connected to the upper portion of the core shaft 1 along a circumferential direction. A lower end opening of the damping flow channel 11 is arranged in the lower portion of the core shaft 1 along a radial direction of the core shaft 1, and in communication with the lower liquid chamber 4. In the present embodiment, it may provide one or a plurality of the damping flow channels 11. The damping flow channel 11 may be shaped to have a spiral or strip-like structure.

In the liquid composite spring according to the present embodiment, liquid can be circulated between the upper liquid chamber 3 and the lower liquid chamber 4 through the damping flow channel 11, and thus a damping force will be generated during the flow. With the resistance generated by the damping flow channel 11 during the flow of the liquid, the liquid will present a certain viscosity when flowing, so that the damping effect is enhanced.

In one embodiment, the damping flow channel 11 is arranged in the core shaft 1 in a spiral manner. With the damping flow channel 11 having a spiral structure, the flow length of the damping flow channel 11 is increased, thereby enhancing the damping effect.

In a preferred embodiment, the core shaft 1 includes two parts, i.e., an inner core 12 of the core shaft and an outer housing 13 of the core shaft. The inner core 12 is of a cylindrical structure, while the outer housing 13 is preferably of a conical structure. A hollow chamber having a shape corresponding to the inner core 12 is formed in a middle portion of the outer housing 13. The outer housing 13 is arranged around the inner core 12 like a sleeve. In the present embodiment, a spiral channel is provided on an outer surface of the inner core 12, thus forming a main body of the damping flow channel 11. The outer housing 13 is provided with a through hole extending along the radial direction, which communicates the spiral channel with the lower liquid chamber 4, thus forming the lower end opening of the damping flow channel 11.

In the liquid composite spring according to the present embodiment, the core shaft 1 is provided with the inner core 12 and the outer housing 13. By means of the two-part structure, the production of the spiral damping flow channel 11 can be facilitated. In addition, the damping flow channel 11 is firstly formed on the outer surface of the inner core 12, and then the inner core 12 is inserted into the outer housing 13 for assembly, which is convenient for the production.

In one embodiment, between the upper liquid chamber 3 and the lower liquid chamber 4 there is provided with a certain space, in which a metal-rubber main spring 23 connecting the upper liquid chamber 3 with the lower liquid chamber 4 is arranged. The metal-rubber main spring 23 is formed by metal and rubber material and has a certain elasticity and a certain rigidness.

In one embodiment, the metal-rubber main spring includes a rubber body 31, which has a middle portion connected to the core shaft 1, an outer portion connected to the outer sleeve 2, an upper end connected to the upper liquid chamber 3, and a lower end connected to the lower liquid chamber 4.

In the liquid composite spring according to the present embodiment, the metal-rubber main spring 23 further includes a plurality of partitioning plates 33, wherein one partitioning plate 33 is nested within an adjacent one. The rubber body 31 is arranged between two adjacent partitioning plates. In the present embodiment, the partitioning plates each have a cylindrical or conical structure, so that one partitioning plate can be nested within an adjacent one. The cross-sectional widths of the partitioning plates are different from each other, wherein a partitioning plate having a relatively larger width is arranged outside of a partitioning plate having a relatively smaller width, with a certain distance formed therebetween to obtain a cross-sectional annular structure. Preferably, in the present embodiment, the inner partitioning plate is relatively long, while the outer partitioning plate is relatively short, wherein the upper ends of all the partitioning plates are connected to the rubber body, so that their heights are relatively close to each other. The upper portion of the lower liquid chamber 4 is formed as having a stepped structure, with an inner side of the step being lower. In this way, when the core shaft 1 moves up and down, the rubber body and its sealing member 22 are driven to deform, thereby causing the partitioning plates 30 to move up and down. Through multiple conical partitioning plates being nested one by one, no serious deviation would be generated in the horizontal direction during the extension or retraction of the core shaft 1.

In one embodiment, the outer sleeve 2 includes a rigid outer sleeve body 21 and a flexible sealing member 22. The outer sleeve body 21 has a cylindrical structure, and the sealing member 22 is arranged at a lower end of the outer sleeve body 21, for sealing a lower end of the lower liquid chamber 4. Therefore, with the flexible sealing member 22, the lower liquid chamber 4 is formed as a flexible chamber. An outer edge of the sealing member 22 is connected to a bottom of the outer sleeve body 21, and a middle portion thereof is connected to the core shaft 1.

In the use of the liquid composite spring according to the present embodiment, the flexible sealing member 22 is provided at the bottom of the outer sleeve 2, so that the lower liquid chamber 4 is formed as a flexible chamber. During flow of fluid, the volume of the lower liquid chamber 4 can be changed due to its deformation, so as to ensure smooth flow of the fluid. In addition, when the core shaft 1 moves, the position of the core shaft 1 relative to the outer sleeve 2 will be also changed, thereby driving the fluid to flow. In this manner, vibration dampening effect can be achieved.

In one embodiment, a metal ring 24 is provided on the outer edge of the sealing member 22, and a groove 25 corresponding to the metal ring 24 is provided on an inner side of the bottom of the outer sleeve body 21. The groove 25 is annular, in which the metal ring 24 can be received. The metal ring 24 and the sealing member 22 may be both connected to the outer sleeve body 21 by respective bolts. Preferably, a rubber pad 26 is further provided between the metal ring 24 and the groove 25.

In the liquid composite spring according to the present embodiment, the metal ring 24 is provided on the outer edge of the sealing member 22. Since the sealing member 22 is made of a flexible material, it can be more firmly connected to the outer sleeve body 21 via the metal ring 24. The outer sleeve body 21 is provided with the groove 25 for restricting the metal ring 24, so that mounting the metal ring in the groove and removing the metal ring from the groove through bolts are both facilitated. Moreover, the sealing performance of the lower liquid chamber 4 as a whole can be also enhanced by the rubber pad 26.

In an embodiment, an inner end of the sealing member 22 is provided with a protrusion 27, which extends in and fixed to the core shaft 1. In this embodiment, the core shaft 1 is provided with a step structure, which has a groove corresponding to the protrusion 27. Therefore, the protrusion 27 can be clamped in the groove. A metal gasket is provided under the step structure. The metal gasket is provided at the other end of the protrusion 27, for fixing the protrusion 27 in position.

In the liquid composite spring according to the present embodiment, the sealing member 22 can be clamped inside the core shaft 1 through the protrusion 27, so that the sealing member 22 is firmly connected to the core shaft 1. In this manner, the sealing performance is enhanced.

According to another aspect of the present invention, a method for adjusting the stiffness and the damping property of a liquid composite spring is also proposed. The method includes the following steps.

In step 1, the outer sleeve 2 of the liquid composite spring is prepared. The outer sleeve 2 is of a universal type, so that different liquid composite springs can share one single outer sleeve 2. In addition, a plurality of core shafts 1 of different models are also prepared, wherein damping flow channels 11 of different types are arranged in the core shafts 1 of different models, respectively.

In step 2, a core shaft 1 of a suitable model is selected according to the requirements on the actual frequency operation condition. The selected core shaft 1 is mounted in the outer sleeve 2, and the metal-rubber main spring is arranged in the outer sleeve 2, so that the upper liquid chamber 3 is formed above the metal-rubber main spring while the lower liquid chamber 4 is formed below the metal-rubber main spring, with the damping flow channel 11 of the core shaft 1 communicating the upper liquid chamber 3 with the lower liquid chamber 4. In the present embodiment, the step of selecting the core shaft 1 of a suitable model can be achieved by changing the entire core shaft 1 or changing a different part of the core shaft 1 (such as the inner core of the core shaft) only. Since the core shaft 1 includes an inner core that may have different damping flow channels 11, and an outer housing 13 of the same structure, changing the core shaft 1 can be achieved by replacing the inner core 12 with a different inner core 12.

In step 3, the upper liquid chamber 3 and the lower liquid chamber 4 are filled with liquid, and the lower end of the outer sleeve 2 is sealed by the sealing member 22, which is a flexible sealing element 22. When the overall structure is under vibration, fluid will flow between the upper liquid chamber 3 and the lower liquid chamber 4 of the liquid composite spring, so that a certain damping force is generated when the fluid flows. For specific stiffness and damping coefficient, a core shaft 1 having a corresponding damping flow channel 11 can be selected. In this way, the stiffness and the damping coefficient of the liquid composite spring can be changed through changing the damping flow channel 11.

In the method according to the present embodiment, the upper liquid chamber 3 and the lower liquid chamber 4 are connected with each other through the damping flow channel 11, so that liquid can flow between the upper liquid chamber 3 and the lower liquid chamber through the damping flow channel 11, thereby enhancing the damping effect. By changing the model of the core shaft 1, the stiffness and the damping coefficient of the liquid composite spring as a whole can be changed. In the present embodiment, the core shafts 1 of different models are prepared to meet different requirements on the rigidness or the damping property. When the rigidness or the damping property is intended to be adjusted, it requires change of the core shaft 1 only, thereby realizing rapid replacement of the core shaft 1 and adjustment of the stiffness of the liquid composite spring.

In one embodiment, when the metal-rubber main spring is installed, multi-layer rubber bodies are vulcanized along a direction from inside to outside, staring from the core shaft 1. An annular partitioning plate is arranged between every two adjacent layers of the rubber bodies, and the outermost layer of the rubber body is connected to the inner wall of the outer sleeve 2. In this way, the rubber bodies and the partitioning plates are vulcanized as a whole.

In the method according to the present embodiment, the inner partitioning plate is relatively long, while the outer partitioning plate is relatively short, wherein the upper ends of all the partitioning plates are connected to the upper liquid chamber 3, so that their heights are relatively close to each other. The upper portion of the lower liquid chamber 4 is formed as having a stepped structure, with an inner side of the step being lower. In this way, when the core shaft 1 moves up and down, the rubber body and its sealing member 22 are driven to deform, thereby causing the partitioning plates to move up and down.

In one embodiment, in step 1, a plurality of core shafts 1 of different models are prepared, wherein the core shafts 1 of different models are provided with damping flow channels 11 of different types, respectively, so as to meet different requirements on the rigidness and the damping property. The damping flow channels 11 of different types have different sizes, such as different widths and lengths, or have different shapes and structures. The cross section of the damping flow channel 11 is preferably a rectangle, but may also be a trapezoid, an arc, or any shape that is capable of connecting the upper liquid chamber 3 with the lower liquid chamber 4. In addition, the length-diameter ratios of the damping flow channels 11 of different types are different from each other.

In a preferred embodiment, a step value of the length-diameter ratio of the damping flow channels 11 of different types is 5 and said length-diameter ratio is ranged from 12 to 110. For example, assuming that the core shaft 1 has 20 models, the step value of the length-diameter ratio of the damping flow channels 11 of different types is 5 and the smallest length-diameter ratio is 15, the length-to-diameter ratios of the damping flow channels 11 in the prepared core shafts 1 are 15, 20, 25, 30, . . . , 100, 105, 110, respectively.

In the method according to the present embodiment, the damping flow channels 11 of different types have different length-diameter ratios. The damping flow channel 11 with a relatively large length-diameter ratio may be used for a liquid composite spring that requires relatively large rigidness and damping property, which is suitable for a situation with a small vibration frequency. By contrast, the damping flow channel 11 with a relatively small length-diameter ratio may be used for a liquid composite spring that requires relatively small rigidness and damping property, which is suitable for a situation with a large vibration frequency.

In one embodiment, in step 1, the models and the quantities of the core shafts 1 are selected according to the requirements on the actual frequency operation condition. Under a low frequency operation condition, such as a vibration frequency less than 15 Hz, a core shaft 1 provided with a damping flow channel 11 having a length-diameter ratio greater than 26 can be selected, while under a high frequency operation condition, such as a vibration frequency greater than 15 Hz, a core shaft 1 provided with a damping flow channel 11 having a length-diameter ratio less than 26 can be selected.

Figure 2:
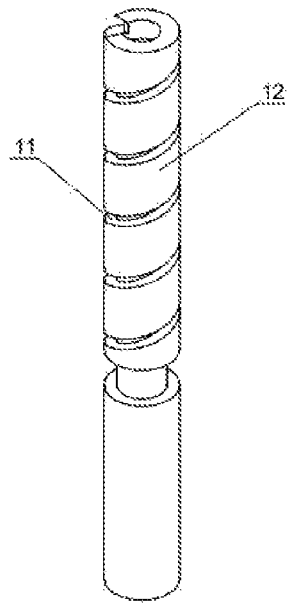
FIG. 2 schematically shows, in a three-dimensional manner, the structure of an inner core of a core shaft according to an embodiment of the present invention.
Figure 3:
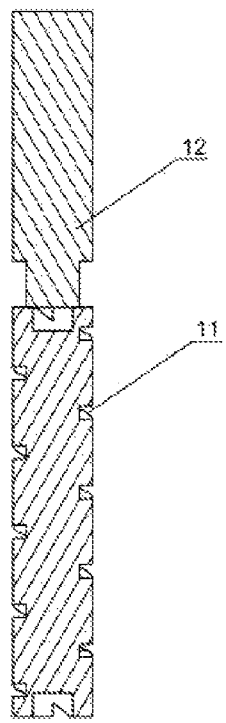
FIG. 3 schematically shows, in a cross-sectional manner, the structure of the inner core of the core shaft according to the embodiment of the present invention.

In an embodiment, as shown in FIGS. 2 and 3, the damping flow channel 11 is arranged in the core shaft 1 in a spiral manner. With the damping flow channel 11 having a spiral structure, the flow length of the damping flow channel 11 is increased, thereby enhancing the damping effect. The upper end opening of the damping flow channel 11 is axially arranged at the top end of the core shaft 1, and in communication with the upper liquid chamber 3. The lower end opening of the damping flow channel 11 is radially arranged in the lower portion of the core shaft 1, and in communication with the lower liquid chamber 4.

In one embodiment, the outer housing 13 is provided with a through hole extending along the radial direction in each of its upper and lower portions. The through hole in the upper portion of the outer housing 13 communicates the spiral channel with the upper liquid chamber 3, thus forming the upper end opening of the damping flow channel 11. In addition, the through hole in the lower portion of the outer housing 13 communicates the spiral channel with the lower liquid chamber 4, thus forming the lower end opening of the damping flow channel 11.

When the core shaft 1 is manufactured through the method according to the present embodiment, the spiral flow channel can be adjusted in terms of the cross-sectional area, the pitch, and the quantity thereof, in order to achieve changes in dynamic performances (such as dynamic stiffness, damping property). Under different requirements on the dynamic performances, the size, the quantity or other parameters of the flow channel can be obtained by calculation, thus achieving rapid replacement of the flow channel.

Although the present invention has been described with reference to preferred embodiments, various improvements can be made to the present invention and components in the present invention can be replaced with equivalent counterparts without deviating from the scope of the present invention. In particular, as long as no structural conflict exists, various technical features as mentioned in different embodiments can be combined in any arbitrary manner. The present invention is not limited to the specific embodiments disclosed herein but contains all the technical solutions falling within the scope of the claims.

The invention claimed is:

1. A liquid composite spring, including:
    an outer sleeve;
    a core shaft connected to the outer sleeve and having a damping flow channel arranged therein, wherein an upper portion of the core shaft is located inside the outer sleeve, while a lower portion thereof extends out of the outer sleeve;
    an upper liquid chamber formed in an upper space inside the outer sleeve, wherein a lower portion of the upper liquid chamber is connected to a top end of the core shaft; and
    a lower liquid chamber formed in a lower space inside the outer sleeve, the lower liquid chamber being connected with the core shaft,
    wherein the damping flow channel communicates liquid in the upper liquid chamber with liquid in the lower liquid chamber;
    wherein the core shaft is provided with multiple models, the core shaft being selected from the multiple models according to actual needs for when the core shaft is to be mounted,
    wherein the damping flow channels of the core shafts of different models have different lengths, cross-sectional areas, and length-diameter ratios; and
    wherein under a low frequency operation condition a core shaft provided with a damping flow channel having a length-diameter ratio greater than 26 is selected, while under a high frequency operation condition a core shaft provided with a damping flow channel having a length-diameter ratio less than 26 is selected.

2. The liquid composite spring according to claim 1, wherein the damping flow channel is arranged in the core shaft in a spiral manner;
    an upper end opening of the damping flow channel is axially arranged at the top end of the core shaft, and in communication with the upper liquid chamber; and
    a lower end opening of the damping flow channel is radially arranged in the lower portion of the core shaft, and in communication with the lower liquid chamber.

3. The liquid composite spring according to claim 2, wherein the core shaft comprises an inner core of the core shaft, and an outer housing of the core shaft arranged around the inner core, and
    wherein a spiral channel is provided on an outer surface of the inner core to form a main body of the damping flow channel arranged in the core shaft in the spiral manner, and the outer housing is provided with a through hole extending along a radial direction, the through hole communicating the spiral channel with the lower liquid chamber to form the lower end opening of the damping flow channel.

4. The liquid composite spring according to claim 1, wherein a certain space is formed between the upper liquid chamber and the lower liquid chamber, and a metal-rubber main spring connecting the upper liquid chamber with the lower liquid chamber is arranged in said space.

5. The liquid composite spring according to claim 4, wherein the metal-rubber main spring includes rubber bodies connected between the core shaft and the outer sleeve, and a plurality of annular partitioning plates, one partitioning plate being nested in another, and
    wherein one of the rubber bodies is arranged between two adjacent partitioning plates.

6. The liquid composite spring according to claim 5, wherein the outer sleeve includes a rigid outer sleeve body having a cylindrical shape, and a flexible sealing member for sealing a lower end of the lower liquid chamber, and
    wherein an outer edge of the sealing member is connected to a bottom of the outer sleeve body, and a middle portion thereof is connected to the core shaft.

7. The liquid composite spring according to claim 6, wherein a metal ring is provided on the outer edge of the sealing member, and a protrusion clamped into the core shaft is provided on an inner end of the sealing member; and
    wherein a groove in cooperation with the metal ring is provided on an inner side of the bottom of the outer sleeve body, the metal ring being located in the groove and connected to the outer sleeve body by a bolt.

8. A method for adjusting stiffness and damping property of a liquid composite spring, comprising:
    preparing an outer sleeve and a plurality of core shafts of different models for the liquid composite spring, wherein said core shafts of different models have different damping flow channels;
    selecting, for corresponding stiffness and damping property, one core shaft from the different models of said core shafts according to requirements on actual frequency operation condition, placing said core shaft selected in the outer sleeve, and mounting a metal-rubber main spring in
    the outer sleeve so that an upper liquid chamber is formed above the metal-rubber main spring while a lower liquid chamber is formed below the metal-rubber main spring, the damping flow channel of the core shaft communicating the upper liquid chamber with the lower liquid chamber; and
    filling the upper liquid chamber and the lower liquid chamber with liquid, respectively, and sealing a lower end of the outer sleeve by a sealing member;
    wherein a core shaft is selected according to the requirements on the actual frequency operation condition,
    wherein under a low frequency operation condition a core shaft provided with a damping flow channel having a length-diameter ratio greater than 26 is selected, while under a high frequency operation condition a core shaft provided with a damping flow channel having a length-diameter ratio less than 26 is selected.

9. The method for adjusting stiffness and damping property according to claim 8, further comprising:
    vulcanizing multiple layers of rubber bodies along a direction from inside to outside, staring from the core shaft, when the metal-rubber main spring is mounted, and
    arranging an annular partitioning plate between every two adjacent layers of the rubber bodies, wherein an outermost layer of the rubber body is connected to an inner wall of the outer sleeve.

10. The method for adjusting stiffness and damping property according to claim 9, wherein the damping flow channels of all core shafts prepared have a length-diameter ratio ranged from 12 to 110, with a step value of 5.

11. The method according to claim 8, wherein the damping flow channel is arranged in the core shaft in a spiral manner;
- an upper end opening of the damping flow channel is axially arranged at a top end of the core shaft, and in communication with the upper liquid chamber; and
- a lower end opening of the damping flow channel is radially arranged in a lower portion of the core shaft, and in communication with the lower liquid chamber.

12. The method according to claim 11, wherein the core shaft comprises an inner core of the core shaft, and an outer housing of the core shaft arranged around the inner core, and
- wherein a spiral channel is provided on an outer surface of the inner core to form a main body of the damping flow channel arranged in the core shaft in the spiral manner, and the outer housing is provided with a through hole extending along a radial direction, the through hole communicating the spiral channel with the lower liquid chamber to form the lower end opening of the damping flow channel.

13. The method according to claim 8, wherein a certain space is formed between the upper liquid chamber and the lower liquid chamber, and the metal-rubber main spring connecting the upper liquid chamber with the lower liquid chamber is arranged in said space.

14. The method according to claim 13, wherein the metal-rubber main spring includes rubber bodies connected between the core shaft and the outer sleeve, and a plurality of annular partitioning plates, one partitioning plate being nested in another, and
- wherein one of the rubber bodies is arranged between two adjacent partitioning plates.

15. The method according to claim 14, wherein the outer sleeve includes a rigid outer sleeve body having a cylindrical shape, and a flexible sealing member for sealing a lower end of the lower liquid chamber, and
- wherein an outer edge of the sealing member is connected to a bottom of the outer sleeve body, and a middle portion thereof is connected to the core shaft.

16. The method according to claim 15, wherein a metal ring is provided on the outer edge of the sealing member, and a protrusion clamped into the core shaft is provided on an inner end of the sealing member; and
- wherein a groove in cooperation with the metal ring is provided on an inner side of the bottom of the outer sleeve body, the metal ring being located in the groove and connected to the outer sleeve body by a bolt.

* * * * *